United States Patent [19]

Renzi et al.

[11] Patent Number: 5,204,430

[45] Date of Patent: Apr. 20, 1993

[54] LIQUID POLYMERIZABLE COMPOSITION FOR THE PRODUCTION OF HIGH REFRACTIVE INDEX OPTICAL ARTICLES

[75] Inventors: Fiorenzo Renzi, Gorgonzola; Franco Rivetti, Schio; Ugo Romano, Vimercate; Claudio Gagliardi, San Donato Milanese; Umberto Sgambato, Milan, all of Italy

[73] Assignee: Enichem Synthesis, S.p.A., Polermo, Italy

[21] Appl. No.: 702,153

[22] Filed: May 14, 1991

Related U.S. Application Data

[63] Continuation of Ser. No. 416,069, Oct. 2, 1989, abandoned, which is a continuation of Ser. No. 168,162, Mar. 15, 1988, abandoned.

[30] Foreign Application Priority Data

Mar. 16, 1987 [IT] Italy ................... 19713 A/87

[51] Int. Cl.$^5$ ............................................ C08F 18/24
[52] U.S. Cl. ..................................................... 526/314
[58] Field of Search ......................................... 526/314

[56] References Cited

U.S. PATENT DOCUMENTS 4,521,577  6/1985  Romano et al. ................... 526/314
4,602,075  7/1986  Kida et al. ........................ 526/314

FOREIGN PATENT DOCUMENTS 2168985A  7/1986  United Kingdom ................ 526/314

OTHER PUBLICATIONS

Asahi Glass Co. Ltd., Chemical Abs., vol. 101, No. 26, Dec. 1984, p. 43, abstract No. 231646k, Columbus, Ohio.
Mitsui Toatsu Chemicals, Inc., Chemicals Abs., vol. 101, No. 14, Oct. 1984, p. 48, abstract No. 112082p, Columbus, Ohio.

Primary Examiner—Christopher Henderson
Assistant Examiner—Alex H. Walker
Attorney, Agent, or Firm—Hedman, Gibson & Costigan

[57] ABSTRACT

A liquid composition comprising:
(A) a monomeric, or essentially monomeric, diallylcarbonate of a possibly halogenated diol containing aromatic groups; or a diallyl-ester of a halogenated aromatic bicarboxy acid;
(B) a reactive monomer selected from diallyl orthophthalate, diallyl isophthalate, diallyl terephthalate, triallyl cyanurate and triallyl isocyanurate;
(C) an oligomeric, or essentially oligomeric, diallylcarbonate of diethylene glycol is polymerized under the action of a free-radical initiator, in order to yield optical articles having a high refractive index, low light dispersion, and with enhanced mechanical and color characteristics.

11 Claims, No Drawings

LIQUID POLYMERIZABLE COMPOSITION FOR THE PRODUCTION OF HIGH REFRACTIVE INDEX OPTICAL ARTICLES

This application is a continuation of application Ser. No. 416,069, filed Oct. 2, 1989, now abandoned, which is a continuation f application Ser. No. 168, 162, filed Mar. 15, 1988, now abandoned.

The present invention relates to a liquid and polymerizable composition, suitable for producing optical articles having a high refractive index, a low light dispersion, and with improved mechanical and colour characteristics. The invention relates also to the optical articles obtained from said compositions.

In the sector of the organic glasses, the products from the polymerization of bis(allyl-carbonates) of diols, and, in particular, of bis(allyl-carbonate) of diethylene glycol are interesting, and namely in view of their optical and mechanical characteristics, which make them useful for the preparation of optical articles; F. Strain, "Encyclopaedia of Chemical Processing and Design", Vol. 1, Interscience Publishers, New York, 1964, pages 799-foll.

However, in the preparation of the optical articles from such polymerizates, relatively higher thicknesses than of the articles from inorganic glasses are required, due to the relatively low values of refractive index typical for said polymerizates. This is disadvantageous both from the viewpoint of the weight of the manufactured article, and also from the standpoint of its aesthetical characteristics, in addition to the difficulties of obtaining high-optical-quality, high-thickness articles.

Therefore, in order to overcome this problem, compositions were developed in the art, which are capable of supplying polymerizates having a relatively high refractive index. These compositions generally include polymerizable compounds of methacrylic, vinylic or allylic type, containing in their molecule an often halogenated aromatic moiety, such as disclosed, e.g., in European patent applications publ. Nos. 82,204, 142,118 and 142,921; in German patent application No. 34 39 935; and in U.K. patent applications Nos. 2,089,523 and 2,155,939.

It was however observed that although on one hand the use of such monomers allows an increase in value of refractive index to be achieved, on the other hand it causes a general decay in the characteristics of the relevant polymerizates, in particular as to colour, abrasion resistance, impact strength and resistance to ageing.

The purpose of the present invention is to overcome the drawbacks of the prior art by means of a liquid and polymerizable composition, suitable for producing high-refractive-index optical articles, with a low light dispersion, and endowed with improved characteristics as to impact strength and colour.

In accordance therewith, the present invention, according to an aspect thereof, relates to a liquid and polymerizable composition comprising:

(A) from 30 to 65% by weight of a monomeric, or essentially monomeric, diallyl-carbonate of a diol containing aromatic groups, definable by the formula (I):

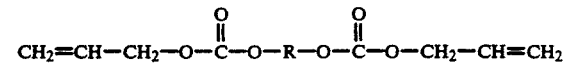

wherein: R is a radical of a diol containing aromatic groups, selected from:

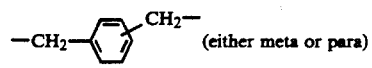

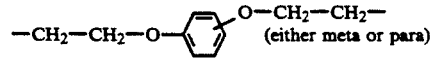

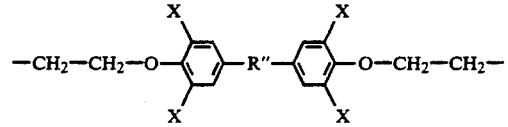

R' being a radical selected from:

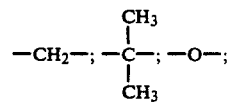

X being each selected from H; Cl; Br; or:
a diallyl-ester of halogenated bicarboxy aromatic acid;

(B) from 15 to 65% by weight of at least a reactive and non-halogenated monomer, selected from diallyl orthophthalate; diallyl ispohthalate; diallyl terephthalate; triallyl cyanurate and triallyl isocyanurate;

(C) from 5 to 40% by weight of an oligomeric, or essentially oligomeric, bis(allyl-carbonate) of diethyleneglycol, which can be defined by means of the formula (II):

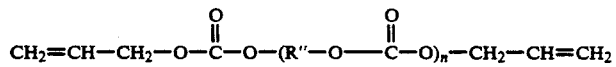

wherein: R" is the radical of diethyleneglycol; and n has a value, or an average value, comprised within the range of from 2 to 5; the composition containing furthermore an amount of from 2 to 8 parts by weight per each 100 parts by weight of the total of (A), (B) and (C) components, of a free-radical initiator. The (A) component, defined by the formula (I), can be in the form of a pure monomer, or it may contain an amount of up to 30% by weight of oligomers thereof, to be defined by means of the formula (III):

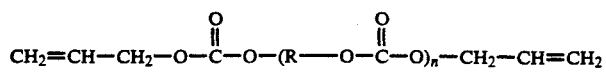

wherein: R has the above indicated meaning; and n has a value larger than 1, up to approximately 5.

These monomer/oligomer mixtures, rich in monomer, can be advantageously prepared by reacting diallyl-carbonate and a diol containing aromatic groups, by operating under transesterification conditions, with a molar ratio of the two reactants to each other equal to, or larger than, 6/1.

A preferred (A) component is the product of transesterification between diallyl-carbonate and 1,1'-isopropylidene-bis (4,4'-hydroxyethyoxy-benzene, in a mutual molar ratio of 12/1, which contains 80-90% of monomer corresponding to formula (I), wherein R is the radical of the above indicated diol containing aromatic groups, and the residual percentage is constituted by the oligomer corresponding to formula (III) wherein R has the above said meaning, and n is of approximately 2.

The (A) component of the composition of the present invention can be alternatively constituted by a diallyl-ester ester of a halogenated aromatic bicarboxy acid and the preferred compounds from this class of substances are diallyl-tetrachlorophthalate and diallyl-tetrabromophthalate.

The (B) component of the composition of the present invention is preferably selected from diallyl isophthalate and diallyl terephthalate.

The (C) component defined by the formula (II) can be in the form of a pure oligomer, or in the form of a mixture of oligomers, or, finally, in the form of a mixture of monomer ($n=1$ in above formula (II)) with one or more oligomer(s), provided that the monomer content in the mixture does not exceed 40% by weight.

These monomer/oligomers mixtures can be advantageously obtained by means of the reaction of diallyl carbonate with diethylene glycol, by operating under transesterification conditions, with a molar ratio of the two reactants to each other of approximately 2/1. Under these conditions, a mixture is obtained, which contains 30-40% by weight of monomer ($n=1$ in above formula (II)), the residual percentage being constituted by oligomers corresponding to formula (II) with an average value of n of approximately 3.

The simultaneous presence of the (A), (B) and (C) components is essential in the composition of the present invention.

In particular, the presence of the (B) component makes it possible liquid compositions to be obtained, which have suitable viscosity values for the processing of the composition, and its transformation into optical articles. Furthermore, the presence of the (A) and (B) components makes it possible the desired values for the refractive index to be reached in the polymerizates. Finally, the presence of the (C) component is essential for obtaining polymerizates with adequate values of colour and of mechanical characteristics, in particular of impact strength.

In the preferred form of practical embodiment, the liquid and polymerizable composition of the present invention contains from 35 to 60% by weight of the (A) component, from 25 to 50% by weight of the (B) component, and from 5 to 25% by weight of the (C) component.

The liquid and polymerizable composition of the present invention contains furthermore one or more polymerization initiator(s), soluble in the same composition, and capable of generating free radicals within a temperature range of from 30° to about 100° C.

Non limitative examples of such initiators are diisopropylperoxydicarbonate, dicyclohexylperoxydicarbonate, di-sec.-butyl-peroxydicarbonate, dibenzoyl peroxide and tert.-butyl-perbenzoate. In the preferred form of practical embodiment, the polymerization initiator is present in the composition in amounts comprised within the range of from 3 to 7 parts by weight per each 100 parts by weight of the total of (A), (B) and (C) components.

The liquid and polymerizable composition of the present invention may additionally contain one or more conventional additive(s), such as stabilizers, release agents, dyes, pigments, U.V. or I.R. absorbers and the like, with the total amount thereof being anyway not larger than 1 part by weight per each 100 parts by weight of the total of (A), (B) and (C) components.

The liquid and polymerizable composition of the present invention is transformed into optical articles by means of the mould polymerization (casting) process.

The polymerization is initiated by the free radicals generated by the decomposition of the polymerization initiators present in the same composition, by generally operating at temperatures of from 35° to 100° C. Under these conditions, the necessary time for the polymerization to procede to completeness is comprised within the range of from 2 to 100 hours.

The so-obtained articles show a high refractive index, a low light dispersion and good values of colour and of mechanical characteristics, as it will be evident from the following experimental examples, which are reported for the purpose of exemplifying the invention without limiting it.

In said examples, the liquid compositions are prepared, the polymerization initiator dicyclohexyl-peroxydicarbonate (DCPD) is added, and the resulting compositions are polymerized inside glass moulds assembled with a flexible gasket of plastified polyvinylchloride, which determines the thickness of the polymeric manufactured article. In particular, flat sheets having a thickness of 1.4 mm and 3.0 mm, and neutral lenses having a thickness of 2.0 mm, are prepared.

The polymerization takes place inside a forced-circulation oven, at the temperature of 48° C. for 72 hours.

On the hardened samples, the characteristics are determined, which relate to:

refractive index ($n_D^{20}$) and light dispersion factor, as measured by means of the Abbe refractometer (ASTM D-542);

Haze and transmittance % in the visible range, measured by the Hazegard XL-211 of Gardner (ASTM D-1003);

Yellow Index (YI), defined as:

$$YI = 100(y) (1.277 X - 1.06 Z)$$

measured by XL-805 colorimeter by Gardner (ASTM D-1925);

Specific gravity as g/cm³, determined by hydrostatic balance at the temperature of 25° C. (ASTM D-792);

Rockell hardness (M), measured by Rockwell durometer (ASTM D-785);

Tensile strength and flexural elastic modulus, measured by INSTRON dynamometer (ASTM D-790);

IZOD impact strength without notch (ASTM D-256, modified);

Thermal distorsion temperature (HDT) (ASTM D-648).

EXAMPLES 1-7

In these examples, as the (A) component, the reaction product of diallyl carbonate and 1,1'-isopropylidene-bis (4,4'-hydroxyethoxy-benzene) in a mutual molar ratio of 12/1 is used, with the reaction being carried out under such general conditions as disclosed in European patent application publ. No. 35304. This (A) component is constituted for approximately 85% by weight by the monomer having formula (I), wherein R is the radical of the above indicated diol, and the residual percentage thereof is constituted by the oligomer having formula (III) wherein n is approximately equal to 2.

As the (B) component, diallyl terephthalate is used.

As the (C) component, the reaction product of diallyl carbonate and diethylene glycol is a mutual molar ratio of 2/1 is used, with the reaction being carried out under such general conditions as disclosed in European patent application publ. No. 35304. This (C) component corresponds to formula (II) with the average value of n being 3, and its monomer content (n−1) being of approximately 35% by weight.

As the free-radical initiator, the composition dicyclohexylperoxydicarbonate (DCPD) is used, in an amount of 6% by weight (approximately 6.6% by weight per each 100 parts by weight of the sum of (A), (B) and (C) components).

The liquid compositions prepared are reported in following Table 1.

In this Table, Example 1 is a comparative example.

TABLE 1

| Example No. | Components (% by weight) | | | |
|---|---|---|---|---|
| | A | B | C | DCPD |
| 1 | 54 | 40 | — | 6 |
| 2 | 47 | 40 | 7 | 6 |
| 3 | 40 | 40 | 14 | 6 |
| 4 | 34 | 40 | 20 | 6 |
| 5 | 54 | 35 | 5 | 6 |
| 6 | 49 | 35 | 10 | 6 |
| 7 | 52 | 35 | 7 | 6 |

In the following Table 2, the characteristics of refractive index ($n_D^{20}$), of specific gravity at 20° C. as g/cm³, and of viscosity at 25°, as cSt, of the so obtained liquid compositions, are reported. The determinations are carried out on the compositions in the absence of peroxide.

TABLE 2

| Example No. | Refractive Index | Specific Gravity | Viscosity |
|---|---|---|---|
| 1 | 1.5331 | 1.145 | 131 |
| 2 | 1.5275 | 1.150 | 105 |
| 3 | 1.5200 | 1.150 | 86 |
| 4 | 1.5130 | 1.154 | 62 |
| 5 | 1.5293 | — | 144 |
| 6 | 1.5256 | — | 129 |
| 7 | 1.5270 | — | 135 |

The compositions of Examples from 1 to 7 are polymerized to form flat sheets having a thickness of 3 mm, by operating according to the above shown modalities, and on such articles the characteristics as reported in Table 3 are determined, besides the light dispersion factors, which resulted of 33 (Example 1); 33 (Example 2); 34 (Example 3); 35.2 (Example 4); 33 (Example 5); 32.9 (Example 6); and 34 (Example 7).

TABLE 3

| | Example No. | | | | | | |
|---|---|---|---|---|---|---|---|
| | 1 | 2 | 3 | 4 | 5 | 6 | 7 |
| Specific Gravity (25° C.; g/cm³) | 1.2389 | 1.2461 | 1.2526 | 1.2592 | 1.2427 | 1.2457 | 1.2445 |
| Shrinkage (%) | 7.5 | 7.7 | 8.2 | 8.4 | — | — | — |
| Refractive Index ($n_D^{20}$) | 1.5640 | 1.5602 | 1.5555 | 1.5519 | 1.5606 | 1.5570 | 1.5586 |
| Yellow Index | 1.87 | 1.87 | 1.86 | 1.83 | 1.46 | 1.52 | 1.54 |
| Haze (%) | 0.15 | 0.18 | 0.14 | 0.12 | 0.15 | 0.17 | 0.20 |
| Transmittance Within Visible Wavelength Range (%) | 91.5 | 91.6 | 91.5 | 91.5 | 91.3 | 91.4 | 91.4 |
| Rockwell Hardness (M) | 105 | 106 | 105 | 105 | 101 | 101 | 100 |
| Flexural Modulus (MPa) | 2400 | 2200 | 2200 | 2150 | 2200 | 2100 | 2200 |
| Flexural Strength (MPa) | 90 | 76 | 77 | 71 | 83 | 75 | 80 |
| Impact Strength-Without Notch (kJ/m²) | 7.1 | 10.4 | 8.1 | 10.9 | 9.9 | 11.2 | 10 |
| Thermal Distorsion Temperature (HDT) (°C.) | 56.9 | 58.2 | 60.2 | 62.1 | 53.2 | 54.0 | 54.0 |

Furthermore, the liquid composition of the Examples from 1 to 7 are transformed by polymerization into lenses of 2.0 mm of thickness, and these lenses are submitted to the test of breakage by means of a steel ball made fall down from a height of 1.27 m. The results of this test are reported in following Table 4, in which the number of broken lenses vs. the number of lenses tested under the various conditions is reported.

TABLE 4

| Example No. | Ball Weight (g) | | | | |
|---|---|---|---|---|---|
| | 16.3 | 18.8 | 21.7 | 24.8 | 44.7 |
| 1 | 1/5 | 1/4 | 1/3 | 1/2 | 0/1 |
| 2 | 0/2 | 1/2 | 0/1 | 1/1 | — |
| 3 | 0/2 | 1/2 | 0/1 | 0/1 | 1/1 |
| 4 | 0/5 | 2/5 | 0/3 | 1/3 | 2/2 |
| 5 | 0/5 | 0/5 | 2/5 | 1/3 | 1/2 |
| 6 | 0/5 | 0/5 | 0/5 | 0/5 | 1/5 |
| 7 | 0/4 | 0/4 | 0/4 | 0/4 | 1/4 |

EXAMPLES 8-11

Liquid compositions are prepared, which contain as the (A) and (C) components those components as reported in Examples 1-7, and diallyl isophthalate as the (B) component. These compositions are reported in Table 5.

TABLE 5

| Example No. | Components (% by Weight) | | | |
|---|---|---|---|---|
| | A | B | C | DCPD |
| 8 | 50 | 40 | 5 | 5 |
| 9 | 45 | 40 | 10 | 5 |
| 10 | 40 | 45 | 10 | 5 |

TABLE 5-continued

| Example No. | Components (% by Weight) | | | |
|---|---|---|---|---|
| | A | B | C | DCPD |
| 11 | 49 | 35 | 10 | 6 |

The so-obtained compositions are polymerized to yield flat sheets of 1.4 mm of thickness. The characteristics of these manufactured articles are reported in Table 6.

TABLE 6

| | Example No. | | | |
|---|---|---|---|---|
| | 8 | 9 | 10 | 11 |
| Refractive Index ($n_D^{20}$) | 1.5622 | 1.5588 | 1.5596 | 1.5573 |
| Yellow Index | 1.18 | 1.15 | 1.22 | 0.99 |
| Rockwell (M) Hardness | 82 | 89 | 87 | 89 |
| Haze (%) | 0.29 | 0.30 | 0.26 | 0.16 |
| Transmittange Within Visible Wavelength Range (%) | 91.7 | 91.8 | 91.9 | 91.8 |

EXAMPLES 12-15

Liquid compositions are prepared, which contain diallyl tetrachlorophthalate as the (A) component, diallyl terephthalate as the (B) component, and with the (C) component of Examples 1-7.

These compositions are reported in Table 7.

TABLE 7

| Example No. | Components (% by Weight) | | | |
|---|---|---|---|---|
| | A | B | C | DCPD |
| 12 | 15 | 45 | 35 | 5 |
| 13 | 20 | 40 | 35 | 5 |
| 14 | 25 | 40 | 30 | 5 |
| 15 | 25 | 35 | 35 | 5 |

The so-obtained compositions are polymerized to yield flat sheets of 1.4 mm of thickness. The characteristics of these manufactured articles are reported in Table 8.

TABLE 8

| | Example No. | | | |
|---|---|---|---|---|
| | 12 | 13 | 14 | 15 |
| Refractive Index ($n_D^{20}$) | 1.5500 | 1.5530 | 1.5590 | 1.5540 |
| Yellow Index | 1.75 | 1.85 | 1.9 | 2.0 |
| Rockwell (M) Hardness | 102 | 103 | 106 | 106 |
| Haze (%) | 0.33 | 0.51 | 0.43 | 0.54 |
| Transmittange Within Visible Wavelength Range (%) | 91.8 | 91.3 | 91.2 | 91.2 |

EXAMPLE 16

A liquid composition is prepared, which is constituted by 15% of diallyl tetrabromophthalate (A); 45% by weight of diallyl terephthalate (B); 35% by weight of the (C) component of Examples 1-7; and 5% by weight of dicyclohexyl-peroxy-dicarbonate (DCPD).

This composition is transformed into a flat sheet having a thickness of 1.4 mm, on which the following characteristics are determined: refractive index ($n_D^{20}$); 1.5495; yellow index :1.70; Rockwell hardness (M): 101; Haze (%) 0.25; and transmittance within the visible range: 92.4.

EXAMPLES 17-19

Liquid compositions are prepared, which contain as the (A) and (C) components those components reported in Examples 1-7, and as the (B) component, a mixture of diallyl terephthalate (B1) and triallyl cyanurate (B2).

These compositions are reported in Table 9.

TABLE 9

| Example No. | Components (% by Weight) | | | | |
|---|---|---|---|---|---|
| | A | B1 | B2 | C | DCPD |
| 17 | 49 | 20 | 15 | 10 | 6 |
| 18 | 44 | 20 | 15 | 15 | 6 |
| 19 | 34 | 25 | 15 | 20 | 6 |

The so-obtained liquid compositions are polymerized to yield flat sheets of 1.4 mm of thickness. The characteristics of these manufactured articles are reported in Table 10.

TABLE 10

| | Example No. | | |
|---|---|---|---|
| | 17 | 18 | 19 |
| Refractive Index ($n_D^{20}$) | 1.5571 | 1.5544 | 1.5510 |
| Yellow Index | 1.40 | 1.45 | 2.85 |
| Rockwell (M) Hardness | 101 | 102 | 106 |
| Haze (%) | 0.14 | 0.15 | 0.15 |
| Transmittance Within Visible Wavelength Range (%) | 91.8 | 91.8 | 91.9 |

EXAMPLES 20 and 21

A liquid composition is prepared, which contains as its (A), (B) and (C) components, those components as reported in Examples 8-11 (Example 20). For comparative purposes, a composition is prepared, which contains the (A) and (B) components are reported in Examples 8-11 (Example 21).

These compositions are reported in Table 11.

TABLE 11

| Example No. | A | B | C | DCPD |
|---|---|---|---|---|
| 20 | 52 | 35 | 7 | 6 |
| 21 | 54 | 40 | — | 6 |

The so-obtained liquid compositions are polymerized as flat sheets of 3.0 mm of thickness, and the characteristics of these manufactured articles are reported in Table 12.

TABLE 12

| | Example No. | |
|---|---|---|
| | 20 | 21 |
| Specific Gravity (25° C.; g/cm³) | 1.2470 | 1.2428 |
| Shrinkage (%) | — | — |
| Refractive Index ($n_D^{20}$) | 1.5589 | 1.5644 |
| Yellow Index | 2.02 | 2.35 |
| Haze (%) | 0.25 | 0.28 |
| Transmittance Within the Visible Range (%) | 91.4 | 91.3 |
| Rockwell Hardness (M) | 106 | 108 |
| Impact Strength, Irod Without Notch (kJ/m²) | 17.2 | 12.5 |
| Thermal Distorsion Temperature (°C.) | 53 | 56 |

We claim:
1. A liquid, polymerizable composition for the production of optical articles having a high refractive index consisting of:
(A) 30 to 65% by weight and in at least essentially monomeric form of either:

(i) the product of transesterification of diallyl-carbonate with an aromatic diol containing aromatic groups selected from the group consisting of:

either meta or para, and

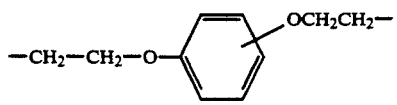

either meta or para,

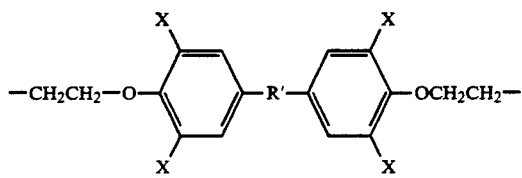

with R' being a radical selected from the group consisting of —CH$_2$—,

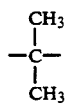

and —O—; with X being selected from the group consisting of H, Cl, and Br, in a mutual molar ratio of 12/1 or (ii) a diallyl ester of a halogenated bicarboxy aromatic acid selected from the group consisting of diallyl-tetra-chloro-phthalate and diallyl-tetrabromo-phthalate;

(B) 15 to 65% by weight and in at least essentially monomeric form of a reactive and non-halogenated monomer selected from the group consisting of diallyl orthophthalate, diallyl isophthalate, diallyl terephthalate, triallyl cyanurate, and triallyl isocyanurated; and (C) 5 to 40% by weight and in at least a trimer or higher oligomeric form of the product of transesterification of diallyl carbonate with diethylene glycol in a molar ratio of 2/1.

2. The composition according to claim 1 wherein the (A) component is the product of reaction between the diallylcarbonate and the diol containing aromatic groups, in a molar ratio equal to or higher than 6/1 and the (A) component contains up to 30% by weight of oligomers of the diallylcarbonate of the aromatic diol.

3. The composition according to claim 2 wherein the diol containing aromatic groups is 1, 1'isopropylidene-bis (4,4'-hydroxyethoxy-benzene).

4. The composition according to claim 1 wherein the diallyl ester of the aromatic bicarboxy acid, as the (A) component, is selected from the group consisting of diallyl-tetrachloro-phthalate and diallyl-tetrabromo-phthalate.

5. The composition according to claim 1 wherein the (B) component is selected from diallyl isophthalate or diallyl terephthalate.

6. The composition according to claim 1, wherein the (C) component is the product of reaction of diallylcarbonate and diethylene glycol in a molar ratio of about 2/1 with the (C) component having not more than 30-40% by weight of monomer.

7. The composition according to claim 1 wherein the composition comprises 35 to 60% by weight of the (A) component, 25 to 50% by weight of the (B) component, and 5 to 25% by weight of the (C) component.

8. The composition according to claim 1 further comprising a free-radical initiator present in an amount of from 2 to 8 parts by weight per each 100 parts by weight of the total of (A), (B) and (C) components.

9. The composition according to claim 1, wherein the free-radical initiator is selected from the group consisting of diisopropyl-peroxy-dicarbonate, dicyclohexyl-peroxy-dicarbonate, di-sec.-butyl-peroxy-dicarbonate, dibenzoyl-peroxide and tert.-butyl-perbenzoate.

10. The composition according to claim 1 further comprising at least one additive selected from the group consisting of stabilizers, release agents, dyes, pigments, U.V. and I.R. absorbers, in a total amount not greater than 1 part by weight per each 100 parts by weight of the sum of (A), (B) and (C) components.

11. Optical articles having a high refractive index, obtained by polymerization of the composition of any of the preceding claims.

* * * * *